United States Patent [19]

Tricoles et al.

[11] 4,385,301
[45] May 24, 1983

[54] DETERMINING THE LOCATION OF EMITTERS OF ELECTROMAGNETIC RADIATION

[75] Inventors: Gus P. Tricoles, San Diego; Eugene L. Rope, El Cajon, both of Calif.

[73] Assignee: General Dynamics Corporation, San Diego, Calif.

[21] Appl. No.: 183,239

[22] Filed: Sep. 2, 1980

[51] Int. Cl.³ .......................... G01S 5/02; G01S 7/04
[52] U.S. Cl. .................................. 343/113 R; 343/17; 343/100 CL; 367/9
[58] Field of Search ............... 343/17, 100 CL, 113 R; 367/8, 9, 40, 42

[56] References Cited

U.S. PATENT DOCUMENTS

| | | | |
|---|---|---|---|
| 3,412,396 | 11/1968 | Mooney, Jr. | 343/5 R |
| 3,803,606 | 4/1974 | Lebail et al. | 343/17 |
| 3,887,923 | 6/1975 | Hendrix | 367/8 |
| 3,889,267 | 6/1975 | Lucas et al. | 343/113 R |
| 4,005,426 | 1/1977 | White | 343/100 CL |

FOREIGN PATENT DOCUMENTS 2001546  7/1970  Fed. Rep. of Germany .......... 367/8

OTHER PUBLICATIONS

K. Sasaki et al., IEEE Transactions on Sonics & Ultrasonics, vol. SU-24, #3, May 1977.

Primary Examiner—S. C. Buczinski
Attorney, Agent, or Firm—Brown & Martin

[57] ABSTRACT

A passive system and method for enabling the display of an image of the location of emitters of electromagnetic radiation that is effective in the lower portion of the HF band. The system essentially includes an array of antennas for receiving electromagnetic radiation from emitters, and for providing a received signal from each emitter in response to the received radiation; a receiver system coupled to each antenna of the array for measuring the phase and intensity of each received signal, and for providing separate coherent phase signals and amplitude signals that respectively indicate the measured phase and intensity; and a signal processor coupled to the receiver system for processing the coherent phase signals and amplitude signals to provide an image signal for generating an image of the emitters. A display device, such as a cathode ray tube or a graph plotter, is coupled to the signal processor for displaying the image of the location of the emitters in response to the image signal.

16 Claims, 10 Drawing Figures

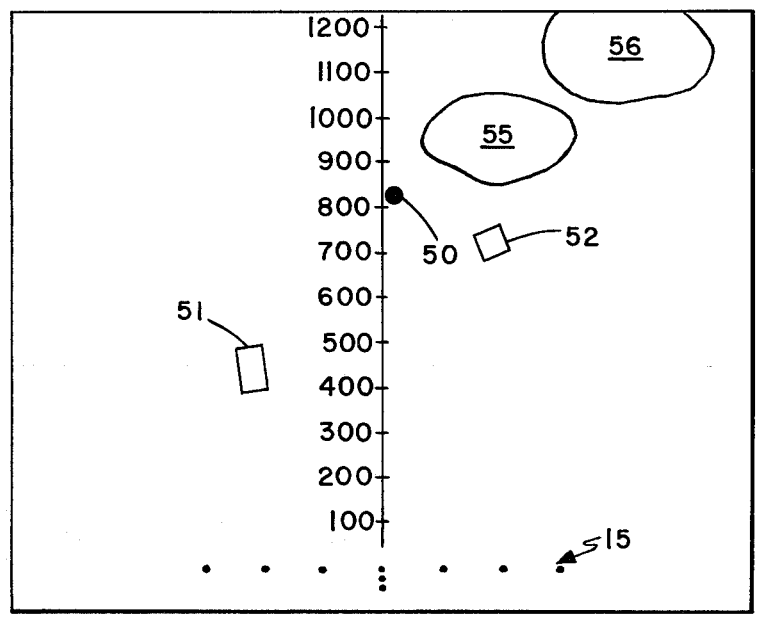
Fig. 7
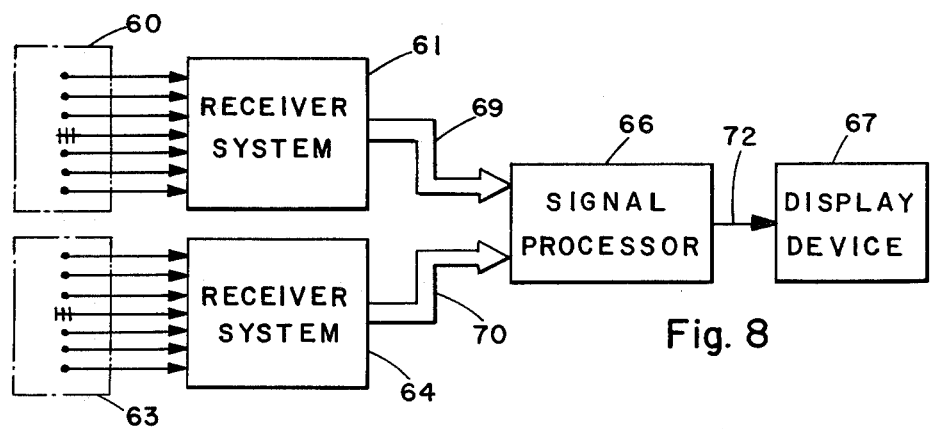
Fig. 8
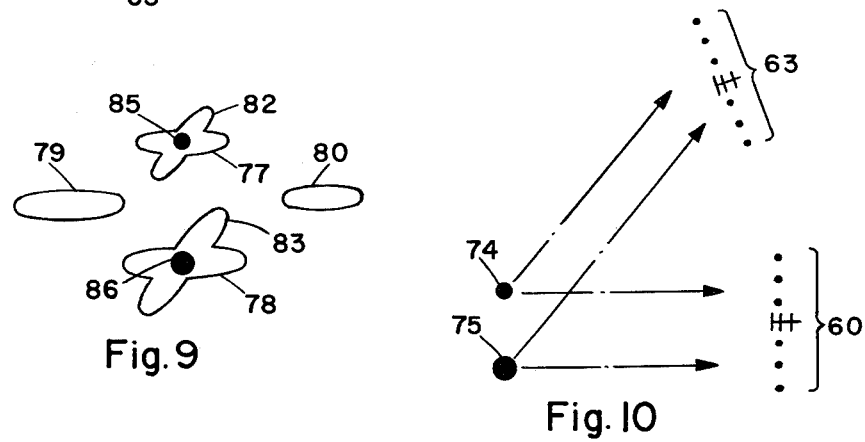
Fig. 9
Fig. 10

DETERMINING THE LOCATION OF EMITTERS OF ELECTROMAGNETIC RADIATION

BACKGROUND OF THE INVENTION

The present invention generally pertains to electronic communications systems and is particularly directed to a passive system and method for enabling the display of an image of the location of emitters of electromagnetic radiation.

It is desirable to be able to provide an image of the location of emitters of electromagnetic radiation behind enemy lines on a battlefield. Such a display enables one to locate the positions of enemy forces.

While there are various prior art direction finding systems for determining the location of a source of electromagnetic radiation, these prior art systems are not practical for battlefield conditions because they are not effective in the lower portion of the high frequency (HF) band, where there usually is a large amount of radio communications on the battlefield.

Although an image of the location of forces on a battlefield can be displayed by such prior art communications systems as radar, these systems emit electromagnetic radiation that enables such systems to be located by enemy forces as a target for return fire.

Any system for locating emitters of electronic radiation on a battlefield should be passive, in that it does not emit any radiation that would enable the location of such system to be determined by enemy forces.

SUMMARY AND THEORY OF THE INVENTION

The present invention is a passive system and method for enabling the display of an image of the location of emitters of electromagnetic radiation that is effective in the lower portion of the HF band. The system essentially includes an array of antennas for receiving electromagnetic radiation from emitters, and for providing a received signal from each emitter in response to the received radiation; a receiver system coupled to each antenna of the array for measuring the phase and intensity of each received signal, and for providing separate coherent phase signals and amplitude signals that respectively indicate the measured phase and intensity; and a signal processor coupled to the receiver system for processing the coherent phase signals and amplitude signals to provide an image signal for generating an image of the emitters. A display device, such as a cathode ray tube or a graph plotter, is coupled to the signal processor for displaying the image of the location of the emitters in response to the image signal.

The concept of the invention is illustrated in FIG. 1. The signal processor simulates a lens 10 for focusing an image 11 of the location of the emitters 12. The simulated lens is expressed by the quadratic phase term.

$$e^{-i\pi y^2/\lambda f} \tag{1}$$

wherein
y is the distance along the cross-range coordinate, as measured from the axis 14 of the lens 10;
$\lambda$ is wavelength; and
f is focal length.

Each received signal provided by an antenna in the array 15 is expressed by the term:

$$a_n e^{i\phi_n} \tag{2}$$

wherein $a_n$ is the amplitude of the nth received signal, and
$\phi_n$ is the phase of the nth received signal.

The values of $a_n$ and $\phi_n$ for each received signal are indicated to the signal processor by the respective coherent phase and amplitude signals provided by the receiver system.

The signal processor provides the image signal by computing the Fresnel transform of the product of each received signal as expressed by Equation (2) and the quadratic phase function of the simulated lens as expressed by Equation (1). The amplitude "u" of the computed image signal is expressed by the equation:

$$u^2 = \left| \int a_n e^{i\phi_n} \cdot e^{-i\pi y^2/\lambda f} \cdot e^{i\sqrt{(Z_i - Z_a)^2 + (Y_i - Y_a)^2}} \, dy \right|^2, \tag{3}$$

wherein
$Z_i$ is the distance along the range coordinate of the image;
$Z_a$ is the distance along the range coordinate of the antenna providing the received signal that is being processed;
$Y_i$ is the distance along the cross-range coordinate of the image; and
$Y_a$ is the distance along the cross-range coordinate of the antenna providing the received signal that is being processed.

Exemplary coordinates $Z_i$ and $Y_i$ of the image and $Z_a$ $Y_a$ of the antenna position are illustrated in FIG. 2. The coordinates $Z_o$ and $Y_o$ of the object are also shown in FIG. 2.

For computational purposes, the simulated lens is treated as being located at the position of the antenna array 15. Preferably, the antennas $A_1, A_2 \ldots A_n$ of the array 15 are disposed in a straight line.

The Fresnel transform is computed for a horizontal image space behind the simulated lens. This surface is referred to as the image space 16. The object space 17 is the horizontal space in front of the simulated lens, (i.e. the antenna array) and the distribution of the emitters is the object that is focused by the simulated lens.

The emitters are represented in image space by pronounced variations in the magnitude of the transform. A maximum of magnitude appears in image space when an emitter is in focus. Accordingly, computations are made for different values of the focal length "f". When the emitter is in focus, the image of the emitter is more intense, and less elongated.

The image space is scaled, whereby the range $Z_i$ of the image can be determined. The range $Z_o$ of the emitter from the antenna array (i.e. the plane of the simulated lens) can then be computed in accordance with the equation:

$$\frac{1}{Z_o} + \frac{1}{Z_i} = \frac{1}{f} \tag{4}$$

Alternative to computation of a Fresnel transform, the image signal may be generated by computation of a Fourier transform of the product of each received signal as expressed by Equation (2) and the quadratic phase function of the simulated lens as expressed by Equation (1). The amplitude "u" of the computed image signal is expressed by the equation:

$$u^2 = |\int a_n e^{i\phi n} \cdot e^{-i\pi y^2/\lambda f} \cdot e^{-i(2\pi y/\lambda)\sin\theta} dy|^2, \quad (5)$$

wherein $\phi$ is the off axis angle in image space from the center of the array, as illustrated in FIG. 2.

Additional features of the invention are discussed in relation to the description of the preferred embodiments.

BRIEF DESCRIPTION OF THE DRAWING

FIG. 7 is a map of the object space containing the emitters of electromagnetic radiation depicted in the image plot of FIG. 5.

FIG. 8 is a schematic block diagram of a preferred embodiment of the present invention including two separate antenna arrays.

FIG. 9 illustrates a display of a resolved image produced with the system of FIG. 8 and further illustrates how unresolved images would be displayed in response to the image signals generated from received signals provided from the separate antenna arrays that are combined to produce the resolved image.

FIG. 10 shows the locations in object space relative to the antenna arrays of the emitters whose locations are displayed in the resolved image of FIG. 9.

DESCRIPTION OF THE PREFERRED EMBODIMENTS

Figure 1:
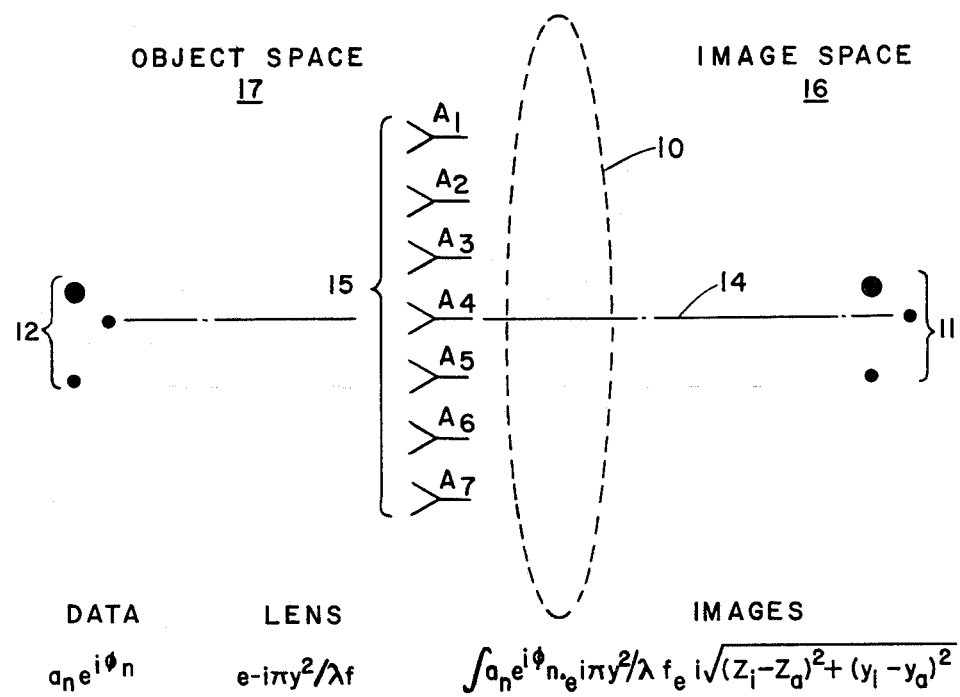
FIG. 1 illustrates the theory of the present invention.
Figure 2:
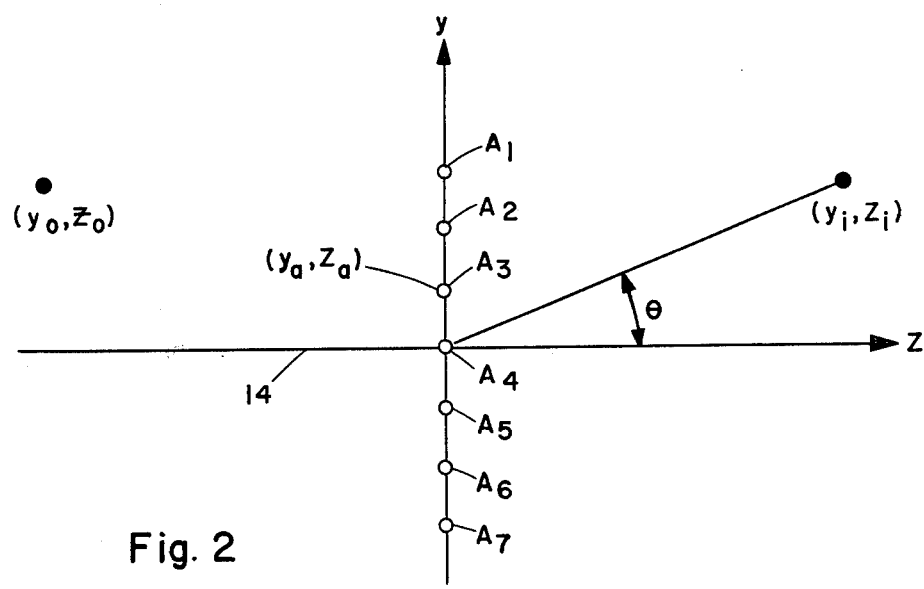
FIG. 2 illustrates the respective coordinates of an emitter, the antenna of the array providing the received signal that is being processed, and the image displayed in response to the computed image signal.
Figure 3:
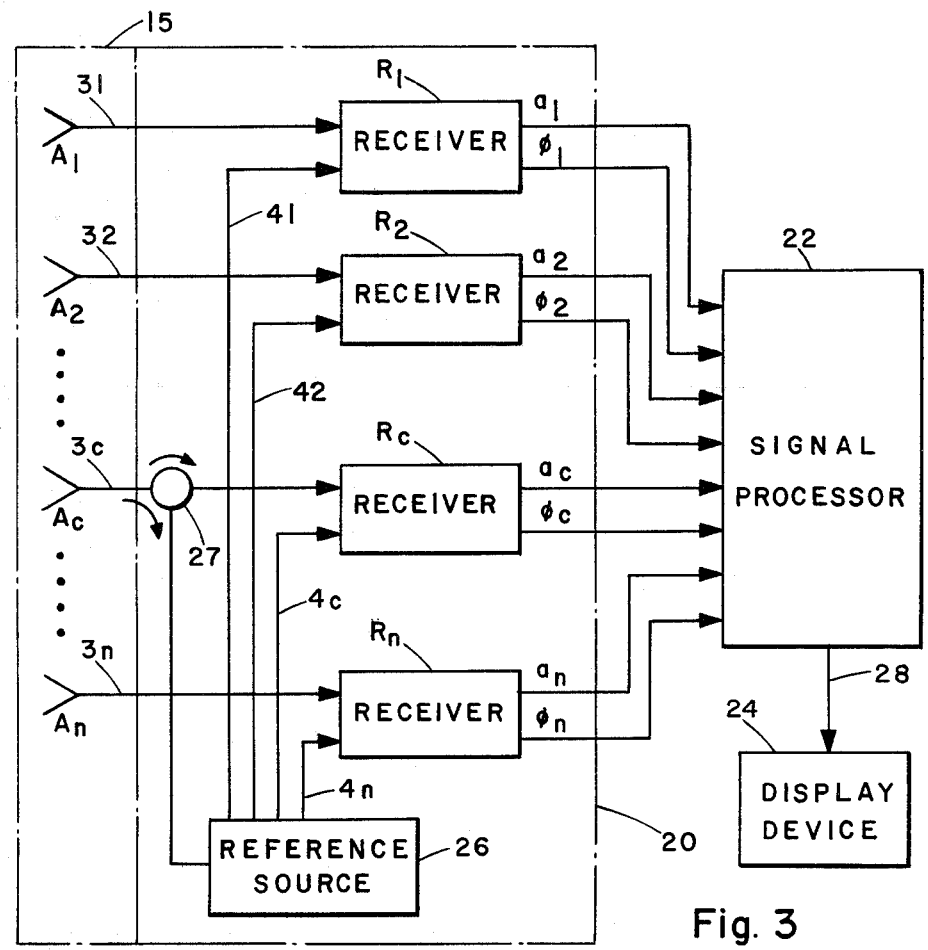
FIG. 3 is a schematic block diagram of a preferred embodiment of the system of the present invention.

A preferred embodiment of a system according to the present invention is illustrated schematically in FIG. 3. The system includes an array 15 of antennas $A_1, A_2 \ldots A_c, \ldots A_n$; a receiver system 20, a signal processor 22 and a display device 24. The subscript designation "C" refers to the central element in the array.

Figure 4:
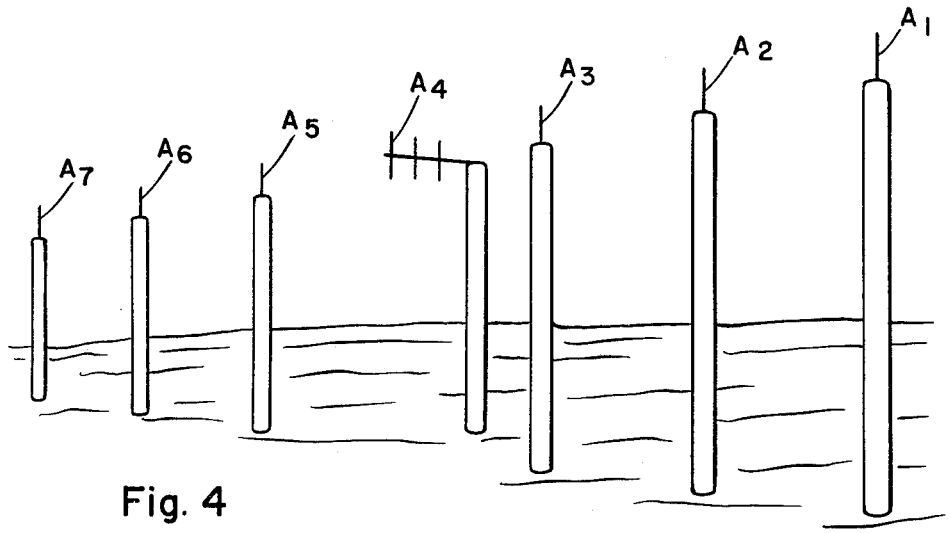
FIG. 4 is a perspective view of the antenna array of the system, of FIG. 3.

An array of antennas $A_1, A_2, \ldots A_7$ is shown in FIG. 4. The antennas are positioned in a straight line along the cross-range coordinate with respect to the object space. The center antenna $A_4$ is a directional antenna that is directed along the range coordinate with respect to the object space. The remaining antennas $A_1, A_2, A_3, A_5, A_6$ and $A_7$ are monopole antennas having a height of $\lambda/4$. The antennas $A_1, A_2, \ldots A_7$ are separated from each other by the distance $\lambda$.

Each of the antennas $A_1, A_2, \ldots A_n$ of the array 15 receives electromagnetic radiation from emitters of electromagnetic radiation located in the object space, and provides a received signal in response to the received radiation. The received signals are provided on lines 31, 32, . . . 3c, . . . 3n respectively.

The receiver system 20 includes a plurality of receivers $R_1, R_2, \ldots R_c, \ldots R_n$ and a reference source 26. The reference source 26 provides a common reference signal on lines 41, 42, . . . 4c, and 4n in response to the received signal provided on the line 3c from the centrally positioned antenna $A_c$ and directed to the reference source 27 via a hybrid junction 27.

The receivers $R_1, R_2, \ldots R_c, \ldots R_n$ are respectively coupled to each of the antennas $A_1, A_2, \ldots A_c, \ldots A_n$ via lines 31, 32, . . . 3c, . . . 3n for measuring the phase and intensity of each received signal in relation to the phase and intensity of the reference signal, and for providing separate coherent phase signals and amplitude signals that respectively indicate the measured phase and intensity. The amplitude signals are provided on lines $a_1, a_2, \ldots a_c, \ldots a_n$, and the phase signals are provided on lines $\phi_1, \phi_2, \ldots \phi_c, \phi_n$.

Alternative to the separate receivers $R_1, R_2, \ldots R_n$, the receiver system 20 may include a signal receiver that is switched to alternately receive the received signals on lines 31, 32, . . . 3c, . . . 3n separately from each of the antennas $A_1, A_2, \ldots A_c, \ldots A_n$.

The signal processor 22 is coupled to the receiver system 20 for processing the coherent phase signals and amplitude signals on lines $a_1, \phi_1, a_2, \phi_2, \ldots a_c, \phi_c, \ldots a_n, \phi_n$ to provide an image signal on a line 28 for generating an image of the location of the emitters. The signal processor 22 includes an analog-to-digital converter for converting the signals received from the receiver system 20 prior to performing the computations based upon the measured values indicated by these signals. The signal processor generates the image signal in accordance with Equation (3) set forth above, or in accordance with equation (5) set forth above.

The display device 24 is coupled to the signal processor 22 for displaying the image of the location of the emitters in response to the image signal provided on the line 28. The display device may be a cathode ray tube or a graph plotter.

Figure 5:
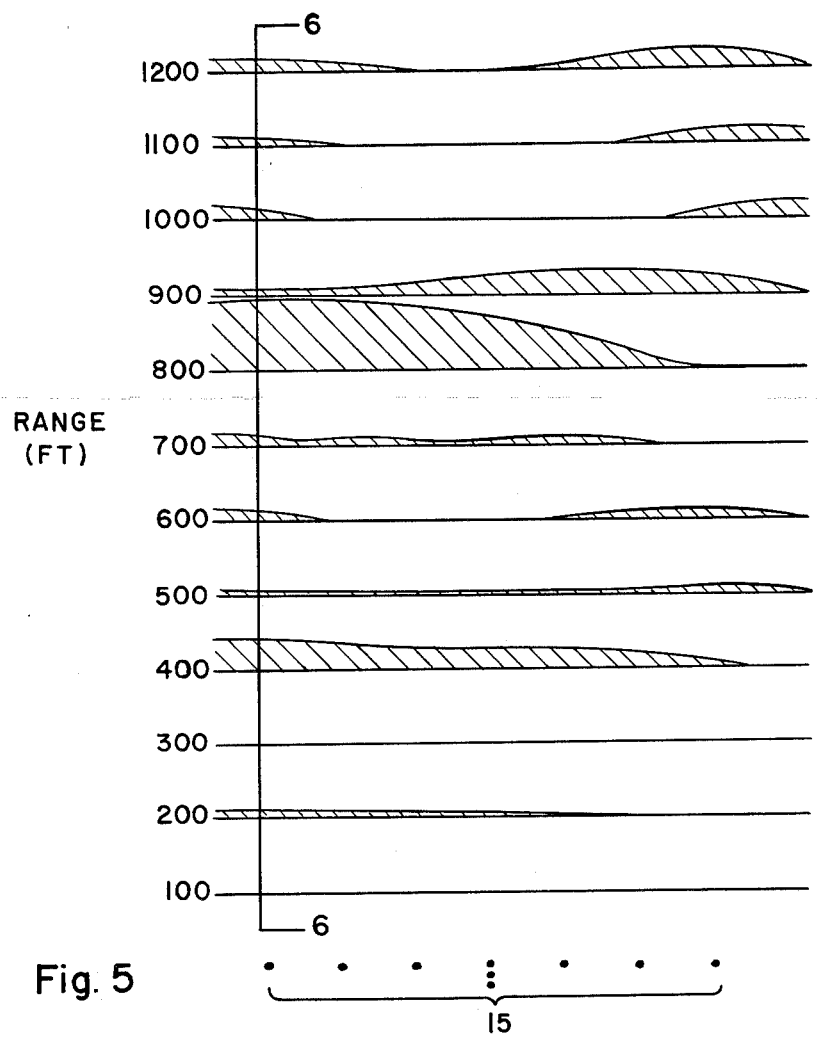
FIG. 5 is a plot of an image of the location of emitters of electromagnetic radiation produced with the system of FIG. 3.

An image of the location of emitters of electromagnetic radiation plotted by a graph plotter in response to an image signal generated by the system of the present invention is shown in FIG. 5. In the display of FIG. 5 image intensity is plotted along cross range coordinates that are spaced at distances corresponding to 100 foot range intervals. The position of the antenna array 15 is shown with respect to the range and cross range coordinates. The image signal from which the plot of FIG. 5 was produced was generated in accordance with computation of the Fresnel transform set forth in Equation (3).

Figure 6:
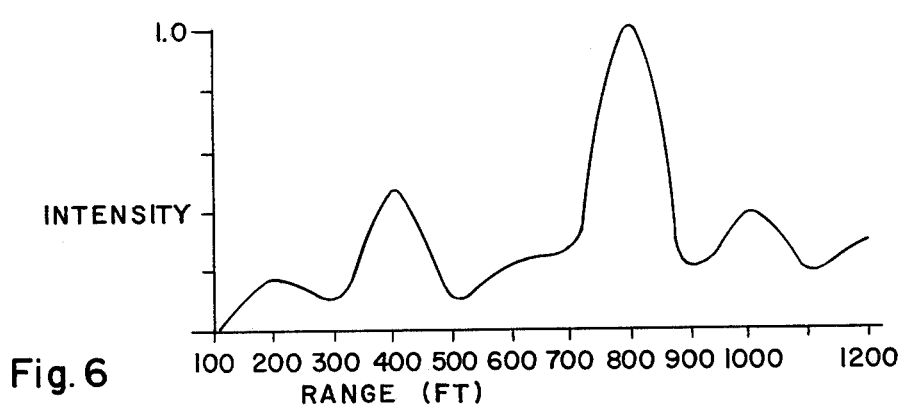
FIG. 6 is a plot of image intensity taken along a range coordinate at the cross dimension 6—6 shown in FIG. 5.

FIG. 6 is an intensity plot taken along a range coordinate at the cross-dimension shown by line 6—6 in FIG. 5 where there appeared to be considerable variation in intensity.

FIG. 7 is a map of the object space containing the emitters of electromagnetic radiation depicted in the intensity image plot of FIG. 5. It is noted that the area of greatest image intensity in the plot of FIG. 5 corresponds to the location of the emitter 50 in FIG. 7. It also is noted that the buildings 51, 52 and hills 55, 56 shown in FIG. 7 were also imaged in the plot of FIG. 5 due to radiation that was reflected from such buildings and hills and detected by the antenna array 15, but that the intensity of the images of the buildings and hills was less than the intensity of the image of the emitter 50.

Having described a preferred embodiment of the system of the present invention, it is appropriate to further discuss the theory of operation of the present invention and to point out certain of the advantages that are derived from some of the features of the preferred embodiment.

The method and system of the present invention are based on holography. They utilize the function of holography to produce an image of objects that are obscured by diffusers. This function requires that both the reference wave and the object wave of the holographic system pass through the diffuser. For HF waves, multipathpropagation resembles light wave propagation through a difusser.

Multipath propagation results from the presence of several waves that are reflected from the terrain and from variation in terrain properties. The antennas $A_1$, $A_2, \ldots A_c, \ldots A_n$ sense wavefronts, including the distortions therein that are due to reflections that produce multiphath propagation. In view of such multipath propagation, the reference wave for the holographic system can be derived from electromagnetic radiation received by one of the antennas in the array, preferably the centrally-located antenna $A_c$. As described with reference to the system of FIG. 3, a reference signal derived by the reference source 26 in response to the received signal on line 3c from the centrally-located antenna $A_c$ is distributed over lines 41, 42, ... 4c, ... 4n to the receivers $R_1, R_2, \ldots R_c, \ldots R_n$ to enable measurement of the phase of the received signals respectively provided by the antennas $A_1, A_2 \ldots A_c, \ldots A_n$. Deriving the reference signal for the system from one of the antennas in the array is advantageous over providing a reference wave provided by a stable oscillator because the fluctuations in a reference signal derived from one of the antennas resembles the fluctuations in the signals received from the other antennas. This enables coherence to be preserved between the separate amplitude and phase signals provided by the receivers $R_1, R_2, \ldots R_c, \ldots R_n$ without having to use a phase locking circuit. Also the dynamic range of the receivers $R_1, R_2, \ldots R_c \ldots R_n$ can be less than that which would be required if the fluctuating received signals on lines 31, 32, ... 3c, ... 3n were being compared with a stable reference signal rather than with the likewise fluctuating reference signal derived from the antenna $A_c$.

In accordance with the present invention, both phase and intensity of the received signals are measured. In optical holography, intensity fringes are measured because photographic film does not respond to phase. Similarly, radio wave holography could be accomplished by measuring only intensity, and such a technique could utilize simplified receivers. However, by measuring both phase and intensity, the number of antennas and apparatus connected thereto need be only one-half that which would be required if only intensity were measured. Also, a smaller number of antennas makes the system more portable.

It also is a feature of the present invention that antennas from which the reference signal is derived is a directional antenna, such as the antenna $A_c$ in FIG. 3, or the antenna $A_4$ in FIG. 4. The radiation pattern of the directional antenna $A_c$, $A_4$ has a minimum towards its rear. As a result, radiation sources located behind the directional antenna $A_c$, $A_4$ contribute only weakly to the reference signal that is derived from the directional antenna $A_c$, $A_4$, and the phase of radiation emanating from such sources is not significant and does not affect the coherence of the measurements made by the receivers $R_1, R_2, \ldots R_c, \ldots R_n$. Providing a directional antenna as the antenna from which the reference signal is derived thereby prevents the system from suffering from ambiguities that would result because of symmetry of all of the antennas in the array 15, including the directional antenna, had radiation patterns that were isotropic in azimuth.

The directivity of the directional antenna also provides another advantage. Because the directional antenna $A_c$ is directional, the received signal that it provides on line 3c is considerably stronger than the received signals provided by the other antennas $A_1, A_2, \ldots A_n$ on the lines 31, 32, ... 3n. Thus when the reference source 26 is a distribution network for providing the reference signal on the lines 41, 42, ... 4c, ... 4n, even though the received signal on line 3c is reduced in power incident to its distribution as the reference signal by the distribution network, such reduction is not so great as to reduce the reference signal amplitude sufficiently to degrade the phase measurements.

The angular resolution of the system determines bearing accuracy and the ability to resolve targets. Resolution of the location of an emitter depends upon $\lambda/L$, where L is the length of the array. Resolution also depends upon mutual coherence of the emitters of electromagnetic radiation being imaged by the system. Typically, radiation from separate emitters is not coherent. Thus, the resolution of images of two emitters is distinct from resolving the image of a single emitter and its related multipath sources of radiation.

In accordance with another aspect of the present invention, separate antenna arrays are utilized to improve image resolution. A preferred embodiment of a system according to this aspect of the present invention is schematically illustrated in FIG. 8. This system includes a first antenna array 60, a first receiver system 61, a second antenna array 63, a second receiver system 64, a signal processor 66 and a display device 67. Each of the first and second antenna arrays 60, 63 is constructed and functions in the same manner as the antenna array 15 in the system of FIG. 3. Each of the first and second receiver systems 61, 64 is constructed and functions in the same manner as the receiver system 20 in the system of FIG. 3. The respective functional cooperation between the first antenna array 60 and the first receiver system 61 and between the second antenna array 63 and the second receiver system 64 is the same as that between the array 15 and the receiver system 20 in the system of FIG. 3. The operation of the first antenna array 60 and the first receiver system 61 is entirely independent of the operation of the second antenna array 63 and the second receiver system 64.

The first antenna array 60 is positioned approximately $50\lambda$ from the second antenna array 63. The first and second antenna arrays 60, 63 are disposed to face in the same general direction, or toward a common object space of interest.

The first receiver system 61 provides separate coherent phase signals and amplitude signals on lines 69 to the signal processor 66; and the second receiver system provides separate coherent phase signals and amplitude signals on lines 70 to the signal processor 66. However, the coherent phase signals and amplitude signals on the lines 69 are not coherent with the coherent phase signals and amplitude signals on the lines 70.

The signal processor 66 processes the first coherent phase signals and amplitude signals on the lines 69 to provide a first image signal for generating a first image of the location of emitters of electromagnetic radiation in the object space. The signal processor 66 further processes the second coherent phase signals and amplitude signals on the lines 70 to provide a second image signal for generating a second image of the location of the emitters. The first and second image signals are separately produced by the signal processor 66 in the same manner that the image signal on line 28 is produced by the signal processor 22 in the system of FIG. 3.

However, the signal processor 66 provides the first and second image signals internally only and combines the first and second image signals to provide a resolved image signal on the line 72 for generating a resolved image of the location of the emitters.

The display device 67 displays the resolved image of the location of the emitters in response to the resolved image signal on the line 72.

FIG. 9 illustrates a CRT display of the resolved image and further illustrates how the first and second images would be displayed in response to the first and second image signals if such signals were not combined to provide the resolved image signal. The location of the emiters 74, 75 in the object space in relation of the first antenna array 60 and the second antenna array 63 is shown in FIG. 10.

Referring to FIG. 9, the first image, which would be displayed in response to the received signals provided by the first antenna array 60, would include a plurality of spots 77, 78, 79 and 80. Spots 77 and 78 are images of the emitters 74 and 75. Spots 79 and 80, however, are false images produced in response to the interaction of the radiation from the closely positioned emitters 74 and 75 that is received by the first antenna array 60. The intensity of spots 79 and 80 depends upon the degree of coherence between the respective radiation from the emitters 74 and 75.

The second image, which would be displayed in response to the received signals provided by the second antenna array 63, would include spots 82 and 83. Spots 82 and 83 also are images of the emitters 74 and 75. The false image produced in response to the interaction of the radiation from the closely positioned emitters 74 and 75 that is received by the second antenna array 63 are located in image space at a considerable distance from the spots 82 and 83 because of the fact that the emitters 74 and 75 are off to one side of the object space faced by the antenna array 63. By way of contrast, the emitters 74 and 75 are in the central portion of the object space faced by the antenna array 60 and as a result, the false images appear near the rear images of the emitters within the corresponding image space.

As a result of the combination of the first and second image signals by the signal processor 66, the resolved image that is displayed shows images of the emitters in only those locations where the spots in the first and second images would overlap, as indicated by the dots 85 and 86.

It is noted in FIG. 9 that the spots 77-80, 82, 83 that would be displayed when an unresolved image is displayed are radially blurred. Such radial blurring depends upon on the f number of the lens simulated by the signal processor 66, and can be reduced by reducing the f number.

We claim:

1. A passive system for enabling the display of an image of the location of emitters of electromagnetic radiation, comprising an array of antennas for receiving electromagnetic radiation, from said emitters and for providing a received signal from each antenna in response to said received radiation;

a receiver system coupled to each antenna of the array for measuring the phase and intensity of each received signal, and for providing separate coherent phase signals and amplitude signals that respectively indicate said measured phase and intensity; and a signal processor coupled to the receiver system for processing the coherent phase signals and amplitude signals to provide an image signal for generating an image of the location of said emitters.

2. A system according to claim 1 further comprising a display device coupled to the signal processor for displaying said image of the location of said emitters in response to the image signal.

3. A system according to claims 1 or 2, wherein the received signal provided by one of the antennas of the array is a reference signal, and wherein the receiver system includes means for measuring the phase of the received signals provided from the other antennas of the array in relation to the phase of the reference signal.

4. A system according to claim 3, wherein the one antenna that provides the reference signal is a directional antenna.

5. A passive system for enabling the display of an image of the location of emitters of electromagnetic radiation, comprising a first array of antennas for receiving electromagnetic radiation from said emitters and for providing a first received signal from each antenna in response to said received radiation;

a first receiver system coupled to each antenna of the first array for measuring the phase and intensity of each first received signal, and for providing first separate coherent phase signals and amplitude signals that respectively indicate said measured phase and intensity;

a second array of antennas for receiving electromagnetic radiation from said emitters and for providing a second received signal from each antenna in response to said received radiation;

a second receiver system coupled to each antenna of the second array for measuring the phase and intensity of each second received signal, and for providing second separate coherent phase signals and amplitude signals that respectively indicate said measured phase and intensity;

a signal processor coupled to the first and second receiver systems for processing the first coherent phase signals and amplitude signals to provide a first image signal for generating a first image of the location of said emitters, for processing the second coherent phase signals and amplitude signals to provide a second image signal for generating a second image of the location of said emitters, and for combining the first and second image signals to provide a resolved image signal for generating a resolved image of the location of said emitters.

6. A system according to claim 5, further comprising a display device coupled to the signal processor for displaying said resolved image of the location of said emitters in response to the resolved image signal.

7. A system according to claims 5 or 6, wherein the received signal provided by one of the antennas of each of the arrays is a reference signal, and wherein each receiver system includes means for measuring the phase of the received signals provided from the other antennas of the array coupled thereto in relation to the phase of the reference signal provided from the one antenna in the array coupled thereto.

8. A system according to claim 7, wherein the one antenna in each array that provides the reference signal is a directional antenna.

9. A passive method of enabling the display of an image of the location of emitters of electromagnetic radiation, comprising the steps of:
   (a) providing a received signal from each antenna or an array of antennas in response to electromagnetic radiation received by the antennas from said emitters;
   (b) measuring the phase and intensity of each received signal and providing separate coherent phase signals and amplitude signals that respectively indicate said measured phase and intensity; and
   (c) processing the coherent phase signals and amplitude signals to provide an image signal for generating an image of the location of said emitters.

10. A method according to claim 9, further comprising the step of:
   (d) displaying said image of the location of said emitters in response to said image signal.

11. A method according to claims 9 or 10,
   wherein one of the provided received signals is a reference signal; and
   wherein step (b) includes the step of:
   (e) measuring the phase of the other received signals in relation to the phase of the reference signal.

12. A method according to claim 11, wherein step (a) includes the step of:
   (f) providing the reference signal from a directional antenna.

13. A passive method of enabling the display of an image of the location of emitters of electromagnetic radiation, comprising the steps of:
   (a) providing a first received signal from each antenna of a first array of antennas in response to electromagnetic radiation received by the antennas from said emitters;
   (b) measuring the phase and intensity of each first received signal and providing first separate coherent phase signals and amplitude signals that respectively indicate said measured phase and intensity;
   (c) processing the first coherent phase signals and amplitude signals to provide a first image signal or generating a first image of the location of said emitters;
   (d) providing a second received signal from each antenna of a second array of antennas in response to electromagnetic radiation received by the antennas from said emitters;
   (e) measuring the phase and intensity of each second received signal and providing second separate coherent phase signals and amplitude signals that respectively indicate said measured phase and intensity; and
   (f) processing the second coherent phase signals and amplitude signals to provide a second image signal for generating a second image of the location of said emitters; and
   (g) combining the first and second image signals to provide a resolved image signal for generating a resolved image of the location of said emitters.

14. A method according to claim 13, further comprising the step of:
   (h) displaying said resolved image of the location of said emitters in response to said resolved image signal.

15. A method according to claims 13 or 14
   wherein one of the received signals provided in each of steps (a) and (d) is a reference signal; and
   wherein steps (b) and (e) each include the step of:
   (i) measuring the phase of the other received signals in relation to the phase of the respectively provided reference signal.

16. A method according to claim 15, wherein steps (a) and (d) each include the step of:
   (j) providing the reference signal from a directional antenna.

* * * * *

UNITED STATES PATENT AND TRADEMARK OFFICE
CERTIFICATE OF CORRECTION

PATENT NO. : 4,385,301
DATED : May 24, 1983
INVENTOR(S) : Gus P. Tricoles and Eugene L. Rope It is certified that error appears in the above-identified patent and that said Letters Patent are hereby corrected as shown below:

Column 9, Claim 9, Line 13, after the word "antenna", change "or" to --of--.

Signed and Sealed this

Ninth Day of August 1983

[SEAL]

Attest:

GERALD J. MOSSINGHOFF

Attesting Officer

Commissioner of Patents and Trademarks